(12) United States Patent
Nishi et al.

(10) Patent No.: US 10,302,324 B2
(45) Date of Patent: May 28, 2019

(54) METHODS AND APPARATUS FOR INSTRUCTING MOVEMENT BASED ON SENSOR DATA

(71) Applicant: Intel Corporation, Santa Clara, CA (US)

(72) Inventors: Yoshifumi Nishi, Beaverton, OR (US); David W. Browning, Beaverton, OR (US); Mark MacDonald, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 15/395,284

(22) Filed: Dec. 30, 2016

(65) Prior Publication Data

US 2018/0188709 A1    Jul. 5, 2018

(51) Int. Cl.
*F24F 11/30*     (2018.01)
*F24F 11/52*     (2018.01)
(Continued)

(52) U.S. Cl.
CPC .............. *F24F 11/30* (2018.01); *F24F 11/46* (2018.01); *F24F 11/52* (2018.01); *F24F 11/58* (2018.01); *F24F 11/62* (2018.01); *G01C 21/206* (2013.01); *G05B 15/02* (2013.01); *F24F 11/63* (2018.01); *F24F 2110/10* (2018.01);
(Continued)

(58) Field of Classification Search
CPC ........... G05B 19/406; G05B 2219/2614; F24F 11/62; F24F 11/30; F24F 11/52; F24F 11/63; G05D 23/1917
See application file for complete search history.

(56) References Cited

U.S. PATENT DOCUMENTS 6,005,549 A * 12/1999 Forest ..................... G06F 3/011
                                                              345/157
6,903,723 B1 * 6/2005 Forest ...................... A61F 4/00
                                                              345/157
(Continued)

FOREIGN PATENT DOCUMENTS

WO      2004003705         1/2004

OTHER PUBLICATIONS

Christian Lundquist, "Location of things: Why location matters in IoT," http://internetofthingsagenda.techtarget.com/blog/IoT-Agenda/Location-of-things-Why-location-matters-in-IoT, IoT Agenda, Apr. 26, 2016, 4 pages.

(Continued)

*Primary Examiner* — Ronald D Hartman, Jr.
(74) *Attorney, Agent, or Firm* — Hanley, Flight & Zimmerman, LLC (57) ABSTRACT

Methods and apparatus to instruct movement based on sensor data. An example apparatus includes a sensor data receiver to receive sensor data from a sensor device, a preference receiver to receive a user preference, and a preference analyzer to: in response to determining that the sensor data indicates that the user preference is not met at a first location, determine if a second location has a condition that meets the user preference, and in response to determining that the second location has the condition that meets the user preference, transmitting a notification to instruct movement to the second location.

22 Claims, 5 Drawing Sheets

(51) Int. Cl.
*F24F 11/62* (2018.01)
*G05B 15/02* (2006.01)
*F24F 11/58* (2018.01)
*F24F 11/46* (2018.01)
*G01C 21/20* (2006.01)
*F24F 11/63* (2018.01)
*F24F 110/10* (2018.01)
*F24F 120/10* (2018.01)
*F24F 130/10* (2018.01)

(52) U.S. Cl.
CPC ....... *F24F 2120/10* (2018.01); *F24F 2130/10* (2018.01); *G05B 2219/2614* (2013.01); *G05B 2219/2642* (2013.01)

(56) References Cited

U.S. PATENT DOCUMENTS

| | | | |
|---|---|---|---|
| 10,158,971 B1* | 12/2018 | Renaldi | H04W 4/02 |
| 2005/0122943 A1 | 6/2005 | Hyun et al. | |
| 2008/0076399 A1 | 3/2008 | Jegal | |
| 2011/0136511 A1 | 6/2011 | Patoskie et al. | |
| 2012/0271471 A1 | 10/2012 | Lee et al. | |
| 2017/0161646 A1* | 6/2017 | Abuelsaad | G06Q 10/02 |
| 2018/0367945 A1* | 12/2018 | Renaldi | H04W 4/02 |

OTHER PUBLICATIONS

Steven Liang, "SensorThings API—Connecting IoT Devices, their Location and their Data," http://www.eclipse.org/community/eclipse_newsletter/2016/march/article2.php, Eclipse, Mar. 2016, 4 pages.

Nest Support, "Managing multiple homes and Nest products with one Nest Account," https://nest.com/support/article/Managing-multiple-homes-and-Nest-products-with-one-Nest-Account, article last updated Dec. 22, 2016, 17 pages.

International Searching Authority, "Search Report and Written Opinion," issued in connection with application No. PCT/US2017/062311, on Mar. 7, 2018, 17 pages.

* cited by examiner

METHODS AND APPARATUS FOR INSTRUCTING MOVEMENT BASED ON SENSOR DATA

TECHNICAL FIELD

This disclosure relates generally to sensors, and, more particularly, methods and apparatus for instructing movement based on sensor data.

BACKGROUND

The Internet of Things (IoT) refers to the growing network of physical objects for which network connectivity has been included. Typically, IoT devices are devices other than traditional computing devices such as laptop computers, desktop computers, servers, etc. Instead, IoT devices are typically devices that have a primary purpose other than general purpose computing (e.g., thermostats, vehicles, electronic appliances (e.g., consumer appliances), lights (e.g., light fixtures, lightbulbs, etc.), infrastructure devices, water meters, electric meters, gas meters, clocks, speaker systems, vending machines, etc.). Many IoT devices include a sensor(s) and report data collected by the sensor (e.g., report the data to a central facility). For example, a thermostat includes a temperature sensor that can report data to a central facility at which data from a plurality of thermostats or other temperature sensors can be collected to develop a better understanding of environmental conditions. This type of data collection is often referred to as crowd source (e.g., collecting information by enlisting the services of a number of people (e.g., internet users) which are paid or unpaid). In some examples, a crowd sourcing entity collects data from a plurality of devices that are not owned by the entity (e.g., at least some of the devices are owned by a plurality of people that are not the entity).

DETAILED DESCRIPTION

Crowd sourcing data collection systems are beneficial for gathering large amounts of information without an entity needing to deploy their own devices (e.g., sensors). However, crowd sourcing systems typically are one directional in that the collected data is utilized and may be viewed by the crowd, but does not directly provide feedback to the crowd of people that are facilitating the data collection.

Methods and apparatus disclosed herein gather sensor information and utilize the information to communicate input back to a person associated with the sensor (e.g., communicate the input to the sensor or an associated device).

For example, when the sensor is a thermostat that reports current ambient temperature and a user preferred temperature (e.g., a thermostat setting) to a system controller, the system controller may determine that it is preferable to instruct the user to move to a different location (e.g., a location that is compatible with the user's preferred temperature (e.g., desired ambient temperature)) rather than instructing a heating/cooling system to modify the ambient temperature at the user's current location. For example, the system controller may transmit, to the sensor or associated device, a notification identifying the different location, a notification including a map overlaid with temperature information, etc.

Accordingly, the system controller can more efficiently control the system (e.g., controller the heating/cooling system) by considering efficiencies that may be gained by controlling the location/movement of people/devices as an alternative to driving a change to the conditions (e.g., in some cases it is more efficient to move a person to an area that already has a temperature desired by the person rather than attempting to change the temperature at the person's current location).

The example methods and apparatus disclosed herein may be utilized with many different control systems and situations. In addition to the temperature system disclosed above, the methods and apparatus may be utilized, for example, to control a lighting system (e.g., multi-room lighting control systems, lighting near a camera, etc.), to drive seating locations and food service placement in a conference or other group room, to suggest times for outdoor activities, etc.

Figure 1:
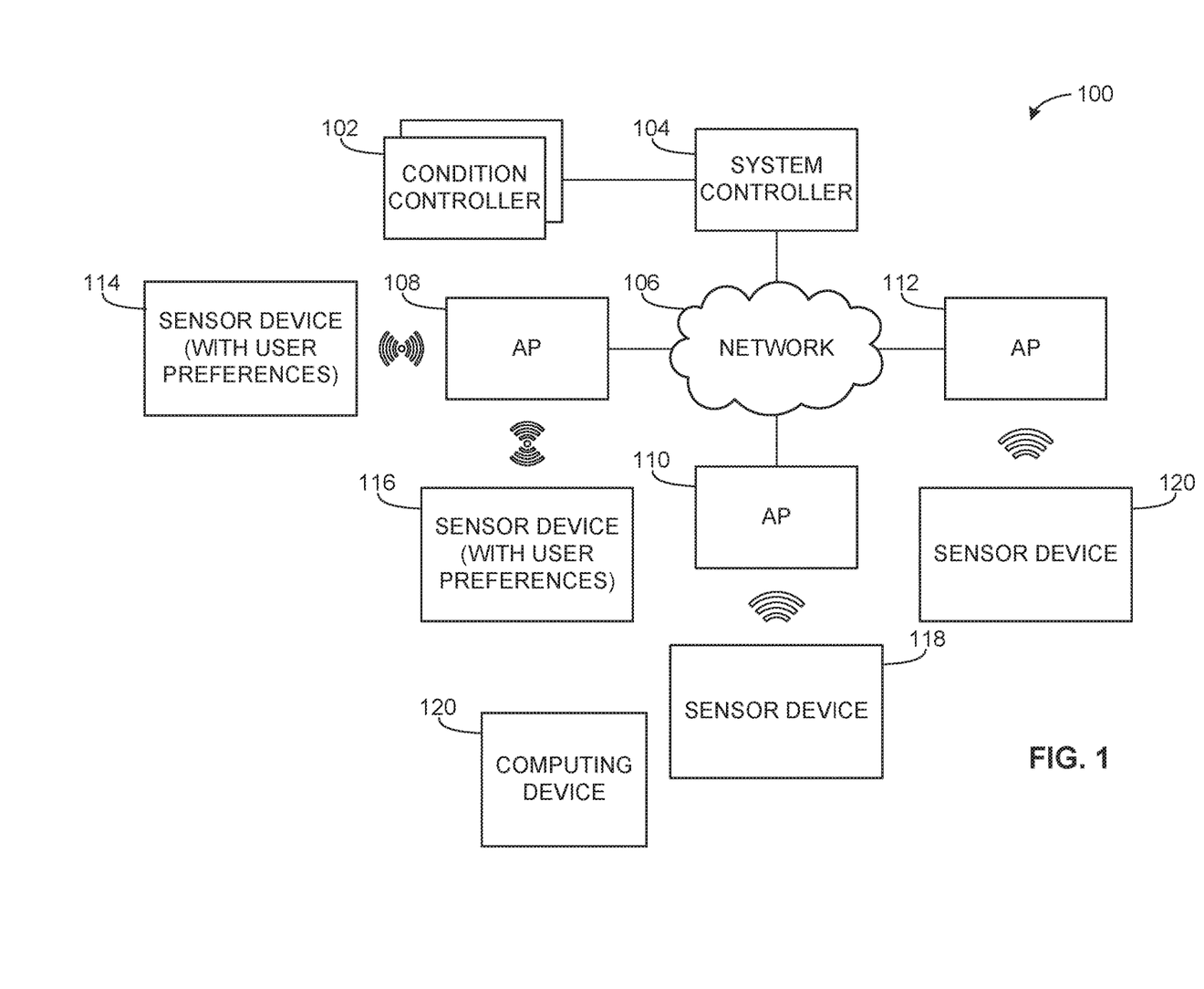
FIG. 1 is a block diagram of an example environment in which a system controller communicates with a plurality of sensors to control a condition.

FIG. 1 is a block diagram of an example environment 100 in which an example condition controller(s) 102 is controlled by an example system controller 104. The example system controller 104 is connected to an example network 106, which communicatively couples the example system controller 104 with first access point (AP) 108, a second AP 110, and a third AP 112. The example first AP 108 communicatively couples an example first sensor device 114 and an example second sensor device 116 to the example network 106. The example second AP 110 communicatively couples an example third sensor device 118 to the example network 106. The example third AP 112 communicatively couples an example fourth sensor device 120 to the example network 106. The example environment 100 also includes an example computing device 120 that is communicatively coupled to the example network 106.

The example condition controller(s) 102 is a heating/cooling system (e.g., one or multiple heating/cooling devices such as a furnace, an air conditioner, etc.) for controlling the ambient temperature in a building. According to the illustrated example, the condition controller(s) 102 are capable of separately controlling the ambient temperature of separate locations within the building (e.g., rooms within the building). The example condition controller(s) 102 are instructed by the example system controller 104 (e.g., the example system controller 104 instructs the condition controller(s) 102 when there is a call for heat, when there is a call for cooling, etc.).

The condition controller(s) 102 may, alternatively, be any other device(s), system(s), and/or combinations for controlling and/or influencing a condition in an environment. For example, the condition controller(s) 102 may be a lighting device(s) and/or system(s) (e.g., a light bulb, a plurality of light bulbs, etc.) that may be adjusted (e.g., turned on, turned off, color adjusted, brightness adjusted, etc.).

The example system controller 104 of the illustrated example is a computing server that receives sensor information from the example sensor devices 114-120 and preference information from the example sensor devices 114, 116 and controls the operation of the example condition controller(s) 102 based on the sensor information and preference information. In addition to controlling the operation of the example condition controller(s) 102, the example system controller 104 communicates instructions to the example sensor devices 114, 116.

For example, the system controller 104 of the illustrated example may receive temperature information and a user preferred temperature from the example first sensor device 114. The system controller 104 may compare the temperature information with the user preferred temperature and determine that the user preferred temperature is not met at the current location of the first sensor device 114. In response to determining that the user preferred temperature is not met, the example system controller 104 may analyze temperature information from other locations (e.g., from the example second sensor device 116, the example third sensor device 118, and the example fourth sensor device 120) and identify a new location at which the user preferred temperature is met. If a location is identified, the example system controller 104 transmits a notification to the example first sensor device 114 (or an associated device) to instruct movement to the new location. Alternatively, if a new location is not identified, the example system controller 104 instructs the example condition controller(s) 102 to control the temperature of the location of the first user device 114 to meet the user preferred temperature.

According to the illustrated example, the system controller 104 determines whether to instruct the example condition controller 102 or instruct movement of one or more of the sensor devices 114-120 based on additionally collected information (e.g., a parameter). For example, the system controller 104 of the illustrated example collects information about a level of power consumption from the example condition controller(s) 102 and utilizes the power consumption information to determine whether to instruct the example condition controller(s) 102 or to instruct movement of the example sensor devices 114-120. For example, the system controller 104 may instruct the condition controller(s) 102 when the power consumption is below a threshold level and may instruct movement of the example sensor devices 114-120 when the power consumption meets or exceeds the threshold.

Figure 2:
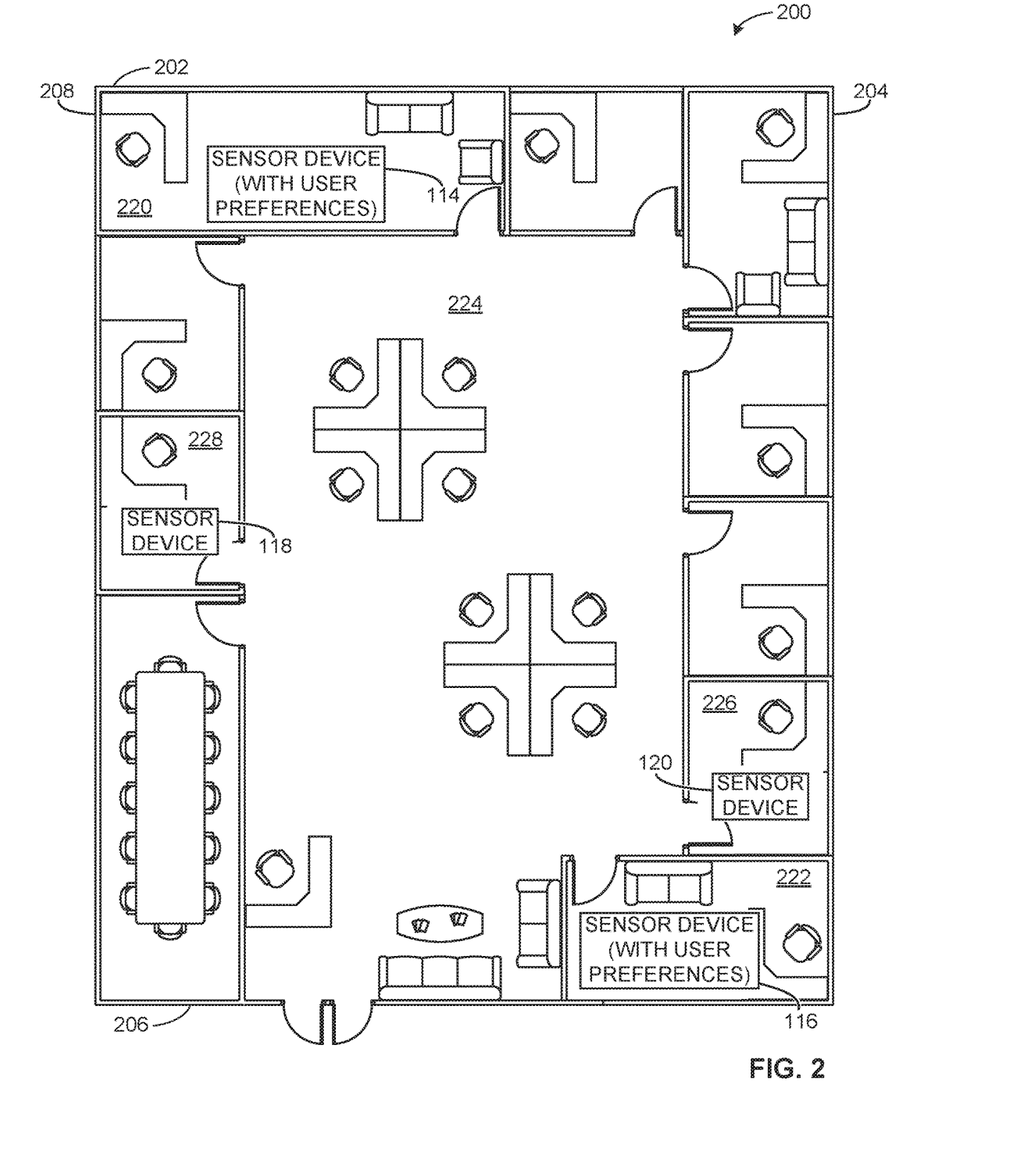
FIG. 2 is an illustration of an example floor plan of a building in which the sensors of FIG. 1 may be located.

The operation of the example system controller 104 is described in further detail in conjunction with the block diagram FIG. 2.

The network 106 of the illustrated example is the internet, which facilitates communication among the components in the example environment 100. Alternatively, the network 106 may be any combination of local area networks, wide area networks, wired networks, wireless networks, etc.

According to the illustrated example, the network 106 is communicatively coupled with the example APs 108-112 to wireless communication with the example sensor devices 114-120. The example APs 108-112 communication with the example network 106 via wired network connections and communicate with the example sensor devices 114-120 via wireless fidelity (Wi-Fi) connections. Alternatively, the APs 108-112 may utilize any types of wired and/or wireless communication for communicating with the example network 106 and/or the example sensor devices 114-120.

The example APs 108-112 receive sensor information collected by the example sensor devices 114-120 and aggregate sensor information from multiple sensors, combine the aggregated sensor information with location information (e.g., based on fixed physical location of the example APs 108-112), and transmit the aggregated sensor information with location information to the example system controller 104 via the example network 106. For example, the example first AP 108 may aggregate sensor information received from the example first sensor device 114 and the example second sensor device 116 and may add a location identifier configured for the first AP 108 with the aggregated sensor information. Alternatively, the APs 108-112 may not perform one or both of aggregating sensor information (e.g., sensor information may be transmitted to the example system controller 104 separately for each of the sensor devices 114-120) and adding location information (e.g., the sensor devices 114-120 may include their own location information).

In some implementations, one or more of the APs 108-112 may not be included in the example environment 100. For example, the sensor devices 114-120 may communicate directly with the example network 106 and/or the example system controller 104.

The sensor devices 114-120 of the illustrated example collect sensor information for transmission to the example system controllers 104. According to the illustrated example, the sensor devices 114-120 are IoT devices that may be transported by a person (e.g., carried by a person as they move throughout a building). Alternatively, one or more of the sensor devices 114-120 may be other types of devices (e.g., a general purpose computing device) and/or may be in a fixed location (e.g., a thermostat mounted to a wall). The sensor devices 114-120 of the illustrated example include an electronic thermometer to determine the ambient temperature of an area. Alternatively, the sensor devices 114-120 may collect any other type of information (e.g., may determine a lighting level, may determine a detected lighting color, may detect a status of a food service device (e.g., determine that a product level is low), etc.).

According to the illustrated example, the example first sensor device 114 and the example second sensor device 116 additionally collect user preference information and transmit the user preference information to the example system controller 104 via the example first AP 108 and the example network 106. The user preference information collected by the example first sensor device 114 and the example second sensor device 116 is a user identification of a preferred temperature (e.g., a thermostat setting). Alternatively, any other user preference information may be collected and transmitted to the example system controller 104 (e.g., a lighting level that a person prefers, a lighting color that a person prefers, a beverage that a person prefers to consume, a lighting level preferred by a camera when taking a picture and/or video, a preferred weather condition for performing an outdoor activity, etc.).

According to the illustrated example, a user of the example third sensor device 118 also operates the example computing device 120. The user may provide user preference information to the example system controller 104 and/or receive notification information using the example computing device 120. For example, the user may carry both the example computing device 120 and the example third sensor device 118. The example computing device 120 is a mobile computing device. Alternatively, the computing device 120 may be any type of device that may be utilized to collect user preferences and/or receive notifications (e.g., a desktop computer, a laptop computer, a tablet, a cellular computing device, an embedded computing device, an IoT device, a display device, etc.).

While FIG. 1 includes the four example sensor devices 114-120, any number of sensors may be utilized in the example environment 100. For example, the environment 100 may include 1, 20, 200, 2000, etc. sensors. Furthermore, while the example environment 100 includes some sensor devices that provide user preferences (e.g., the example sensor devices 114, 116) and some sensor devices that do not provide user preferences (e.g., the example sensor devices 118, 120), other environments may include only sensor devices that provide user preferences or only sensor devices that do not provide user preferences (e.g., user preferences may be provided from another source (e.g., computing devices such as the example computing device 120)). Additionally, some or all of the sensor devices (e.g., the sensor devices with user preferences or the sensor devices without user preferences) may be associated with computing devices that provide user preferences.

FIG. 2 is an illustration of an example floor plan 200 of a building in which the example sensor devices 114-120 of FIG. 1 may be located. The example floor plan 200 illustrates a single floor of a building bounded by four walls 202, 204, 206, 208. The example floor plan includes five identified rooms: an example first room 220, an example second room 222, an example third room 224, an example fourth room 226, and an example fifth room 228.

According to the illustrated example, the example first sensor device 114 is initially located in the example first room 220, the example second sensor device 116 is located in the example second room 222, the example third sensor device 118 is located in the example fifth room 228, and the example fourth sensor device 120 is located in the example fourth room 226. Thus, by the distribution of the example sensor devices 114-120, the conditions (e.g., temperature) at multiple locations in the floor plan may be collected at the example system controller 104. The example system controller 104 may utilize the information to generate a map of conditions across the example floor plan 200.

In operation, the example first sensor device 114 may collect a condition (e.g., temperature information) and a user preference (e.g., a preferred temperature) from the example first sensor device 114. As described in conjunction with FIG. 1, the example first sensor device 114 transmits the condition and user preference to the example system controller 104 via the example first AP 108 and the example network 106. The example system controller 104 determines if the user preference is met (e.g., by determining the sensed condition with the user preference). When the user preference is not met, the system controller 104 determines an action to take (e.g., instruct the example condition controller 102 to modify the condition or instruct the example sensor device 114 to move to a different location). In determining the action, the example system controller 104 may additionally analyze other external information (e.g., power consumption information retrieved from the example condition controller(s) 102). For example, the example system controller 104 may determine that the condition is met at another location in the floor plan by analyzing a generated condition map and may determine that power consumption of the condition controller(s) 102 already exceeds a threshold. In such an example, instead of instructing the condition controller to modify the condition in the example first room 220, the example system controller 104 transmits an instruction to the example first sensor device 114 to instruct movement to another location at which the user preference is determined to be met. For example, if the user preference is a temperature greater than the current temperature in the example first room 220, the system controller 104 may determine that the sun is shining on the exterior side of the example second wall 204, thereby, increasing the temperature of the room along the second wall 204 without the need for a call to operate the condition controller(s) 102. Accordingly, rather than attempting to modify the conditions in the example first room 220, example system controller 104 may instruct the example first sensor device 114 to move to a location adjacent the example second wall 204 at which the increased temperature will meet the user preference.

Figure 3:
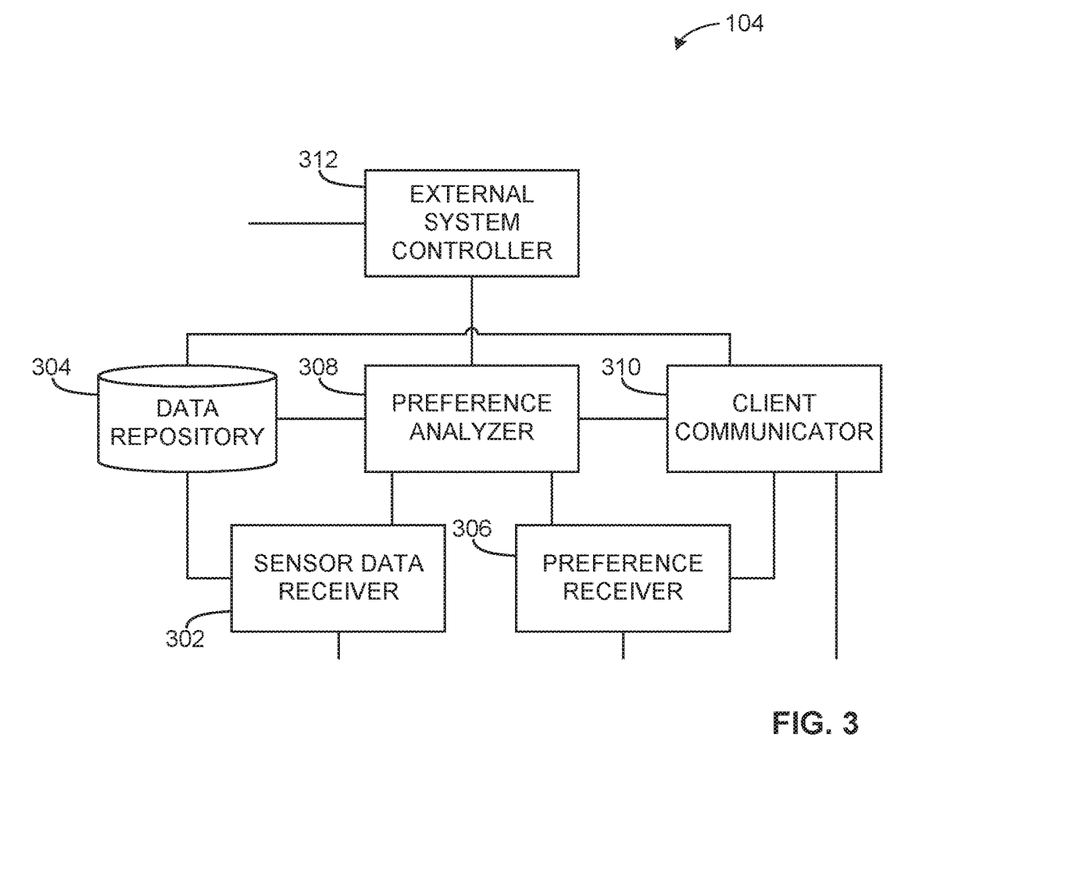
FIG. 3 is a block diagram of an example implementation of the system controller of FIG. 1.

FIG. 3 is a block diagram of an example implementation of the example system controller 104. The example system controller of FIG. 3 includes an example sensor data receiver 302, an example data repository 304, an example preference receiver 306, an example preference analyzer 308, an example client communicator 310, and an example external system controller 312.

The example sensor data receiver 302 receives sensor data from the example sensor devices 114-120 (e.g., via the example APs 108-112 and/or the example network 106). When the example APs 108-112 aggregate the sensor data from multiple ones of the example sensor devices 114-120, the example sensor data receiver unbundles the example sensor data. The example sensor data receiver 302 stores the received sensor data in the example data repository 304. The example sensor data receiver 302 also transmits the received sensor data to the example preference analyzer 308. The example sensor data receiver 302 is a network interface for interfacing with the example network 106. Alternatively, the sensor data receiver 302 may be any other type of communication device.

The example data repository 304 is a database for storing sensor data collected by the example sensor data receiver 302 (e.g., for use in generating a map of conditions (e.g., temperature conditions across the example floor plan 200)). Alternatively, the example data repository may be any other type or combination of types of data storage (e.g., a file, a disk, a memory, etc.).

The example preference receiver 306 receives preference data from the example sensor devices 114-120 (e.g., the example first sensor device 114 and the example second sensor device 116 via the example first AP 108 and/or the example network 106). The example preference receiver 306 transmits the received preference data to the example preference analyzer 308. The example preference receiver 306 is a network interface for interfacing with the example network 106. Alternatively, the preference receiver 306 may be any other type of communication device.

The example preference analyzer 308 of the illustrated example receives the sensor data from the example sensor data receiver 302 and the preference data from the example preference receiver 306 (e.g., receives sensor data and preference data collected by the example first sensor device 114). The example preference analyzer 308 compares the preference data with the sensor data to determine if the preference is met (e.g., determines if a temperature included in the sensor data meets a desired temperature identified in the preference data). The example preference analyzer 308 determines an action to take when the sensor data indicates that the preference is not met. For example, the example preference analyzer 308 may determine whether to instruct the example client communicator 310 to instruct movement to a new location at which the preference is met or to instruct the example external system controller 312 to control an external system (e.g., the example condition controller(s)

102 of FIG. 1 to modify the conditions near the source of the example sensor data to meet the preference.

The example preference analyzer 308 communicates with the example client communicator 310 to determine if a location (e.g., a location within the example floor plan 200 meets the preference identified in the example preference data). In addition, the example preference analyzer 308 communicates with the example external system controller 312 to retrieve information about an external system (e.g., information about the example condition controller(s) 102). For example, the preference analyzer 308 may determine a power consumption level of the example condition controller(s) 102. In some examples, the preference analyzer 308 may not collect one or both of the location information and the information about the external system.

The example client communicator 310 determines location information for sensor data and/or preference data received by the example system controller 104. For example, the client communicator 310 may determine the location information based on an identify and known fixed location of the APs 108-112, from a location identified by the example sensor devices 114-120, by retrieving location information from the example data repository 304, etc. The example client communicator 310 may generate a map correlating received sensor data (e.g., sensor data from multiple ones of the example sensor devices 114-120). The example client communicator 310 receives an indication of a preference from the example preference analyzer 308 (e.g., when the preference is not met as indicated by sensor data associated with the preference) and determines if there is a location at which the reference is met (e.g., analyzes the mapped locations to determine if there is a location having a condition that meets the preference). The example client communicator 310 notifies the example preference analyzer when another location meets the preference.

The example external system controller 312 interfaces with an example system such as the example condition controller(s) 102 to collect information from the external system and to instruct operation of the external system. For example, the external system controller 312 collects system status information (e.g., power consumption information) from the example condition controller(s) 102. In addition, when instructed to modify a condition by the example preference analyzer 308, the example external system controller 312 transmits an instruction to the example condition controller(s) 102.

While an example manner of implementing the example system controller 104 of FIG. 1 is illustrated in FIG. 3, one or more of the elements, processes and/or devices illustrated in FIG. 3 may be combined, divided, re-arranged, omitted, eliminated and/or implemented in any other way. Further, the example sensor data receiver 302, the example data repository 304, the example preference receiver 306, the example preference analyzer 308, the example client communicator 310, the example external system controller 312, and/or, more generally, the example system controller 104 of FIG. 3 may be implemented by hardware, software, firmware and/or any combination of hardware, software and/or firmware. Thus, for example, any of the example sensor data receiver 302, the example data repository 304, the example preference receiver 306, the example preference analyzer 308, the example client communicator 310, the example external system controller 312, and/or, more generally, the example system controller 104 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor data receiver 302, the example data repository 304, the example preference receiver 306, the example preference analyzer 308, the example client communicator 310, the example external system controller 312, and/or, more generally, the example system controller 104 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example system controller 104 may include one or more elements, processes and/or devices in addition to, or instead of, those illustrated in FIG. 3, and/or may include more than one of any or all of the illustrated elements, processes and devices.

Figure 4:
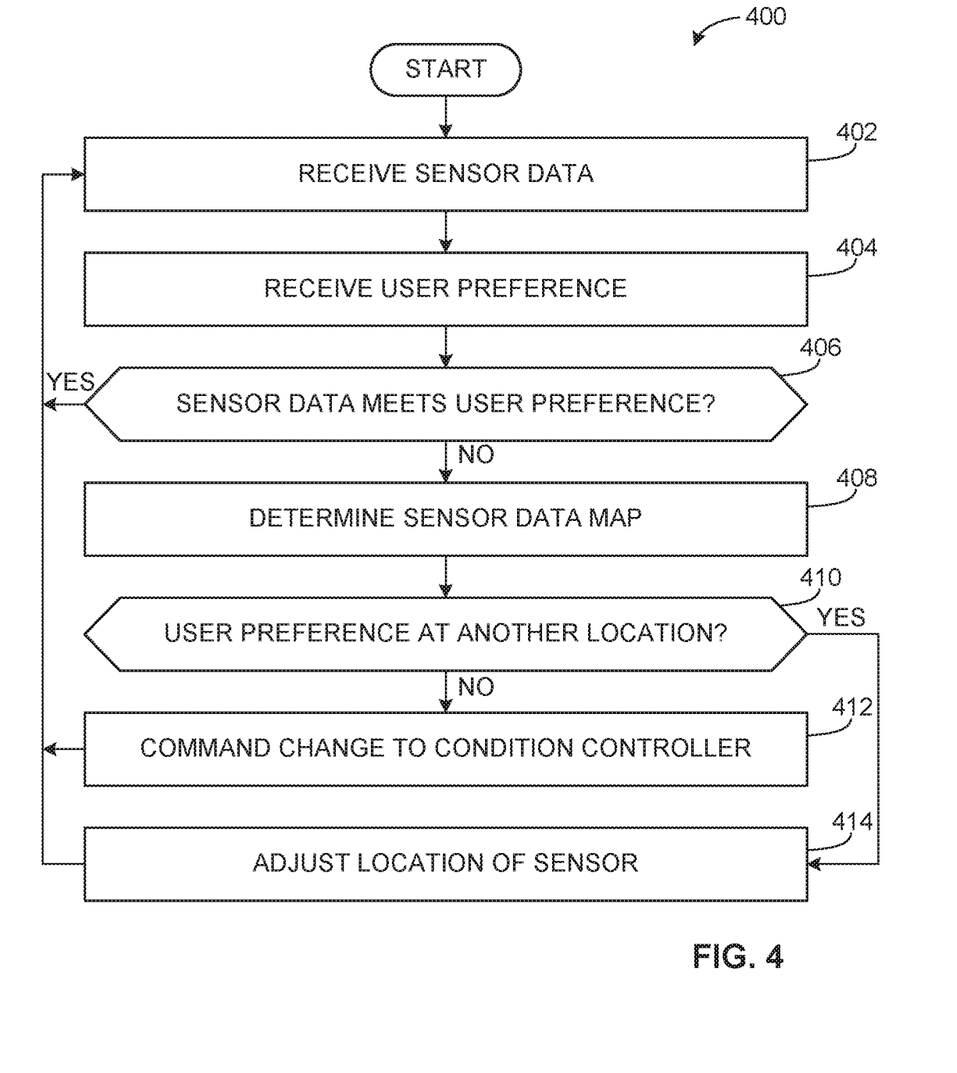
FIG. 4 is a flow diagram representative of example machine readable instructions that may be executed to implement the system controller of FIG. 1 and/or FIG. 3.

A flowchart representative of example machine readable instructions for implementing the example system controller 104 of FIG. 1, and/or FIG. 3 are shown in FIG. 4. In this example, the machine readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example system controller 104 may alternatively be used. For example, the order of execution of the blocks may be changed, and/or some of the blocks described may be changed, eliminated, or combined.

As mentioned above, the example processes of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example process 400 of FIG. 4 begins when the example sensor data receiver 302 receives sensor data (block 402). For example, the sensor data receiver 302 may receive sensor data from the example first sensor device 114. The example preference receiver 306 receives user preference information (block 404). For example, the preference receiver 306 may receive preference data from the example first sensor device 114.

The example preference analyzer 308 determines if the sensor data indicates that conditions meet the user preferences (block 406). For example, the preference analyzer 308 determines if temperature information identified in the sensor data meets a desired temperature identified in the preference data. When the sensor data meets the preference data, control returns to block 402 to process the next sensor data and preference data.

When the sensor data does not meet the preference data (block 406), the example client communicator determines a sensor data map (block 408). For example, the client communicator 310 may correlate previously received sensor data (retrieved from the example data repository 304) with location information to determine a map of conditions across an area (e.g., across the example floor plan 200).

The example client communicator 310 determines if the preference is met at another location (block 410). When the preference is not met, the example preference analyzer instructs the example external system controller to instruct an external system (e.g., the example condition controller(s) 102) to change the condition to meet the preference (block 412). For example, the external system controller 312 sets the user preferred temperature at the condition controller(s) 102 associated with the location of the source of the source data. When the preference is met at another location, the example preference analyzer 308 instructs the example client communicator to transmit an instruction to a source of the example sensor data (e.g., the example first sensor device 114) to move to the identified location (block 414). In some examples, transmitting the instructions to move to the identified location include transmitting a map identifying conditions at available locations to allow a user to decide to move to a preferred location.

While the foregoing examples are described with reference to temperature control, the disclosed methods and apparatus may be applied to any system in which a condition may be collected from a sensor and analyzed. For example, the preference analyzer 308 may receive sensor data about a lighting level and may receive preference information about a desired lighting level. The desired lighting level may be indicated as a preference based on a schedule (e.g., a calendar application). According the preference analyzer 308 may control a lighting level to turn off or reduce lighting when a calendar indicates that a person is not present in a room. In addition, the type of lighting may be adjusted based on an activity indicated on a calendar (e.g., configure warm lighting for arrival in an office, configure dark lighting when the calendar indicates computer work is being performed (e.g., computer aided drawing), configure a neutral color during document review indicated on the calendar, and turn the lights off when the calendar indicates that the person will leave for the day).

In another example, the preference data may indicate both a desired temperature and a desired beverage for consumption. The preference analyzer 308 may, thus, group people in a room based on both their preference for a beverage and a temperature.

In another example, the preference data may indicate a lighting level desired by a camera attempting to take a photograph. The example preference analyzer 308 may control a lighting level at a time that the camera attempts to take the photograph to provide an optimal condition for the photograph. However, the preference analyzer 308 may determine that the lighting level will not be changed when requested by the camera. For example, the preference analyzer 308 may instruction the client communicator 310 to instruct the camera to wait a period of time until the preference analyzer 308 instructs the external system controller to modify the lighting level, the preference analyzer 308 may cause the client communicator 310 to transmit an instruction for the camera to move to a different location at which the desired lighting level is met, etc.

Figure 5:
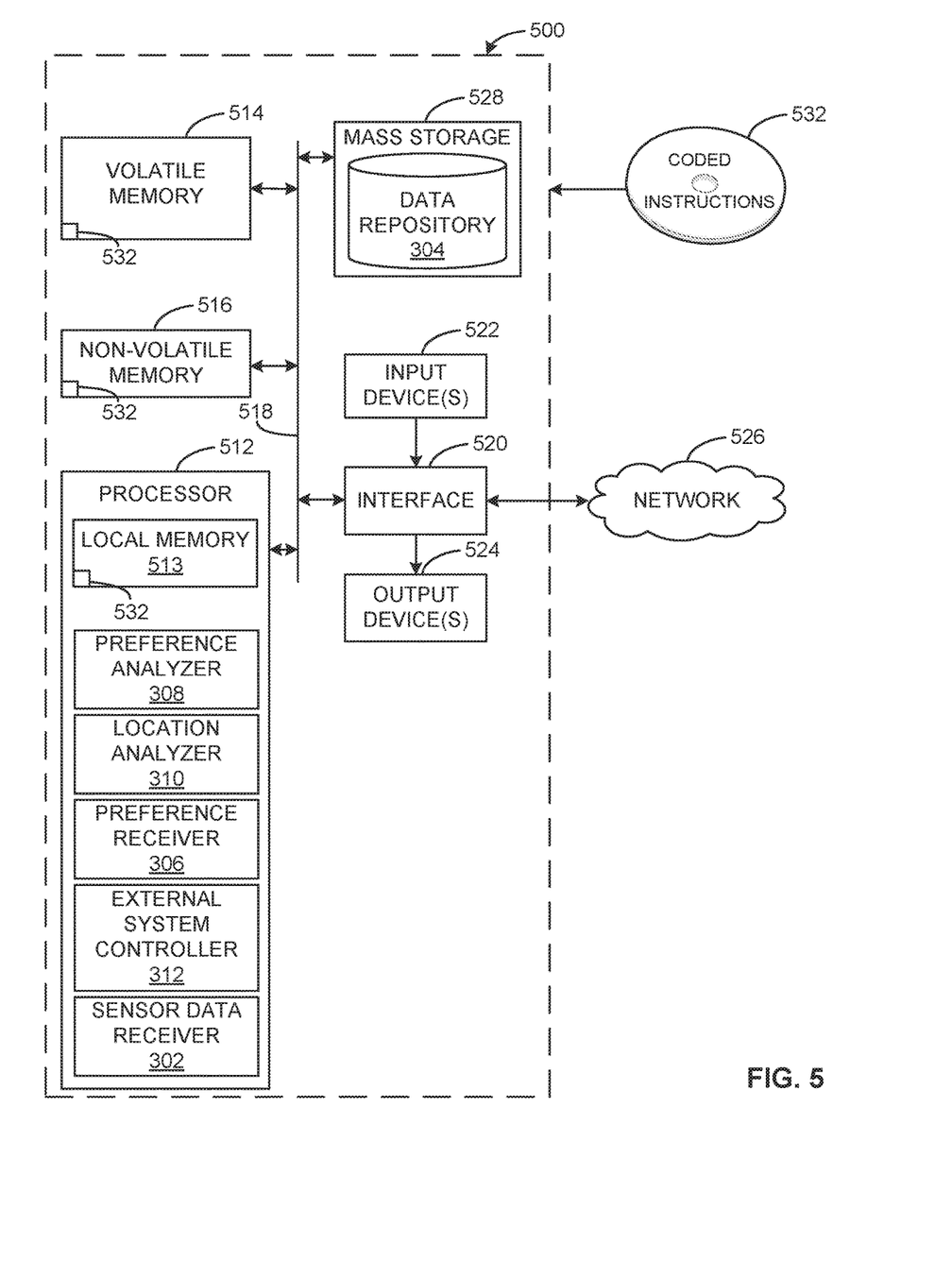
FIG. 5 is a block diagram of an example processor system structured to execute the example machine readable instructions represented by FIG. 4 to implement the example system controller of FIG. 1 and/or FIG. 3.

In another example, the preference data may indicate desired conditions for an outdoor activity (e.g., walking a dog, washing a car, etc.). For example, the preference data may be collected from an IoT capable dog leash. The sensor data may include weather data collected from an internet weather source, sensor data indicating the presence of a being (e.g., another dog, a human (e.g., a mail carrier), etc.) or an object (e.g., a mail truck, a garbage, truck, etc.) outside the home, etc. Accordingly, the preference analyzer 308 may determine a time that a desired weather condition is expected and the client communicator 310 may transmit the predicted time to the IoT dog leash (or any other device). Alternatively, the IoT dog leash may detect that it has been picked up and transmit a sensor data to the example system controller 104 (e.g., transmit a user preference to begin the outdoor activity). In response to the detection, the example preference analyzer 308 may determine the current conditions from available sensor data. When the current conditions are acceptable (e.g., meet the user preference (e.g., not raining, temperature between 50 degrees Fahrenheit and 90 degrees Fahrenheit, etc.), the client communicator 310 may transmit an instruction to continue the activity. When the current conditions are not acceptable or the preference analyzer 308 determines another time at which the conditions are preferred, the client communicator 310 may transmit the FIG. 5 is a block diagram of an example processor platform 500 capable of executing the instructions of FIG. 5 to implement the example system controller 104 of FIG. 1 and/or FIG. 3. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The example processor 512 includes the example sensor data receiver 302, the example preference receiver 306, the example preference analyzer 308, the example client communicator 310, and the example external system controller 312. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives. The example mass storage devices 528 stores the data repository 304.

The coded instructions 532 of FIG. 5 may be stored in the mass storage device 528, in the volatile memory 514, in the non-volatile memory 516, and/or on a removable tangible computer readable storage medium such as a CD or DVD.

From the foregoing, it will be appreciated that the above-described methods and apparatus facilitate collection of sensor data and user preferences and the efficient response to the user preference. In some examples, energy consumption is reduced by efficiently deciding whether to control a condition (e.g., by instructing a condition change in an external system such as a heating/cooling systems) or to instruct movement to a location that meets a preference without the need to change a condition.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems and articles of manufacture to instruct movement based on sensor data are disclosed herein. Further examples and combinations thereof include the following.

Example 1 is an apparatus to instruct movement based on sensor data, the apparatus comprising: a sensor data receiver to receive sensor data from a sensor device, a preference receiver to receive a user preference, and a preference analyzer to: in response to determining that the sensor data indicates that the user preference is not met at a first location, determine if a second location has a condition that meets the user preference, and in response to determining that the second location has the condition that meets the user preference, cause transmission of a notification to instruct movement to the second location.

Example 2 includes the apparatus as defined in example 1, further including an external system controller to determine a condition of an external system.

Example 3 includes the apparatus as defined in example 2, wherein the condition is a level of power consumption of the external system.

Example 4 includes the apparatus as defined in example 2 or example 3, wherein the preference analyzer is further to, in response to determining that the second location has the condition that meets the user preference, cause the external system controller to instruct a condition controller to operate to change the condition at the first location.

Example 5 includes the apparatus as defined in example 2 or example 3, wherein the external system is at least one of a heating system or a cooling system.

Example 6 includes the apparatus as defined in example 5, wherein the user preference is a desired ambient temperature.

Example 7 includes the apparatus as defined in one of examples 1-3, further including a client communicator to determine the first location associated with the sensor data and the user preference.

Example 8 includes the apparatus as defined in one of examples 1-3, wherein the sensor device is an Internet of Things device to be carried by a user.

Example 9 includes the apparatus as defined in one of examples 1-3, wherein the notification includes a map of conditions at the second location and other location.

Example 10 includes the apparatus as defined in example 9, wherein the preference analyzer is further to generate the map based on sensor data received from a plurality of sensor devices.

Example 11 includes the apparatus as defined in one of examples 1-3, wherein the user preference is received from the sensor device.

Example 12 includes the apparatus as defined in one of examples 1-3, further including a client communicator to transmit the notification to a client device that transmitted the user preference.

Example 13 includes the apparatus as defined in example 12, wherein the sensor device is the client device.

Example 14 is a method to instruct movement based on sensor data, the method comprising: in response to determining that received sensor data indicates that a user preference is not met at a first location, determining if a second location has a condition that meets the user preference, and in response to determining that the second location has the condition that meets the user preference, transmitting a notification to instruct movement to the second location.

Example 15 includes the method as defined in example 14, further including determining a condition of an external system.

Example 16 includes the method as defined in example 15, wherein the condition is a level of power consumption of the external system.

Example 17 includes the method as defined in example 15 or example 16, further including, in response to determining that the second location has the condition that meets the user preference, instructing a condition controller to operate to change the condition at the first location.

Example 18 includes the method as defined in example 15 or example 16, wherein the external system is at least one of a heating system or a cooling system.

Example 19 includes the method as defined in example 18, wherein the user preference is a desired ambient temperature.

Example 20 includes the method as defined in one of examples 14-16, further including determining the first location associated with the sensor data and the user preference.

Example 21 includes the method as defined in one of examples 14-16, wherein the sensor data is received from an Internet of Things device carried by a user.

Example 22 includes the method as defined in one of examples 14-16, wherein the notification includes a map of conditions at the second location and other location.

Example 23 includes the method as defined in example 22, further including generating the map based on sensor data received from a plurality of sensor devices.

Example 24 includes the method as defined in one of examples 14-16, wherein the sensor data and the user preference are received from a sensor device.

Example 25 includes the method as defined in one of examples 14-16, further including transmitting the notification to a client device that transmitted the user preference.

Example 26 includes the method as defined in example 25, wherein the sensor data is received from the client device.

Example 27 is a non-transitory machine readable storage medium comprising instructions that, when executed, cause a machine to at least: in response to determining that received sensor data indicates that a user preference is not met at a first location, determine if a second location has a condition that meets the user preference, and in response to determining that the second location has the condition that meets the user preference, transmit a notification to instruct movement to the second location.

Example 28 includes the non-transitory machine readable storage medium as defined in example 27, wherein the instructions, when executed, cause the machine to determine a condition of an external system.

Example 29 includes the non-transitory machine readable storage medium as defined in example 28, wherein the condition is a level of power consumption of the external system.

Example 30 includes the non-transitory machine readable storage medium as defined in example 28 or example 29, wherein the instructions, when executed, cause the machine to, in response to determining that the second location has the condition that meets the user preference, instruct a condition controller to operate to change the condition at the first location.

Example 31 includes the non-transitory machine readable storage medium as defined in example 28 or example 29, wherein the external system is at least one of a heating system or a cooling system.

Example 32 includes the non-transitory machine readable storage medium as defined in example 31, wherein the user preference is a desired ambient temperature.

Example 33 includes the non-transitory machine readable storage medium as defined in one of examples 27-29, wherein the instructions, when executed, cause the machine to determine the first location associated with the sensor data and the user preference.

Example 34 includes the non-transitory machine readable storage medium as defined in one of examples 27-29, wherein the sensor data is received from an Internet of Things device carried by a user.

Example 35 includes the non-transitory machine readable storage medium as defined in one of examples 27-29, wherein the notification includes a map of conditions at the second location and other location.

Example 36 includes the non-transitory machine readable storage medium as defined in example 35, wherein the instructions, when executed, cause the machine to generate the map based on sensor data received from a plurality of sensor devices.

Example 37 includes the non-transitory machine readable storage medium as defined in one of examples 27-29, wherein the sensor data and the user preference are received from a sensor device.

Example 38 includes the non-transitory machine readable storage medium as defined in one of examples 27-29, wherein the instructions, when executed, cause the machine to transmit the notification to a client device that transmitted the user preference.

Example 39 includes the non-transitory machine readable storage medium as defined in example 38, wherein the sensor data is received from the client device.

Example 40 is a system comprising: a sensor device to collect sensor data, a client device to transmit a user preference, and a system controller to: receive sensor data from the sensor device, receive the user preference from the client device, in response to determining that the sensor data indicates that the user preference is not met at a first location, determine if a second location has a condition that meets the user preference, and in response to determining that the second location has the condition that meets the user preference, transmit a notification to instruct movement to the second location.

Example 41 includes the system as defined in example 40, wherein the client device is the sensor device.

Example 42 includes the system as defined in example 40 or example 41, wherein the system controller transmits the notification to the sensor device.

Example 43 includes the system as defined in example 40 or example 41, wherein the system controller transmits the notification to the client device.

Example 44 is an apparatus to instruct movement based on sensor data, the apparatus comprising: a means for receiving sensor data from a sensor device, a means for receiving a user preference, and a means for, in response to determining that the sensor data indicates that the user preference is not met at a first location, determining if a second location has a condition that meets the user preference, and a means for, in response to determining that the second location has the condition that meets the user preference, transmitting a notification to instruct movement to the second location.

Example 45 includes the apparatus as defined in example 44, further including means for determining a condition of an external system.

Example 46 is a method to instruct movement based on sensor data, the method comprising: in response to determining that received sensor data indicates that a user preference is not met at a first location, determining if a second location has a condition that meets the user preference, and in response to determining that the second location has the condition that meets the user preference, transmitting a notification to instruct movement to the second location.

Example 47 includes the method as defined in example 46, further including determining a condition of an external system.

Example 48 includes the method as defined in one of examples 46-47, wherein the condition is a level of power consumption of the external system.

Example 49 includes the method as defined in one of examples 46-48, further including, in response to determining that the second location has the condition that meets the user preference, instructing a condition controller to operate to change the condition at the first location.

Example 50 includes the method as defined in one of examples 46-49, wherein the external system is at least one of a heating system or a cooling system.

Example 51 includes the method as defined in one of examples 46-50, wherein the user preference is a desired ambient temperature.

Example 52 includes the method as defined in one of examples 46-51, further including determining the first location associated with the sensor data and the user preference.

Example 53 includes the method as defined in one of examples 46-52, wherein the sensor data is received from an Internet of Things device carried by a user.

Example 54 includes the method as defined in one of examples 46-53, wherein the notification includes a map of conditions at the second location and other location.

Example 55 includes the method as defined in one of examples 46-54, further including generating the map based on sensor data received from a plurality of sensor devices.

Example 56 includes the method as defined in one of examples 46-55, wherein the sensor data and the user preference are received from a sensor device.

Example 57 includes the method as defined in one of examples 46-56, further including transmitting the notification to a client device that transmitted the user preference.

Example 58 is an apparatus comprising means to perform a method as set forth in one of examples 46-57.

Example 59 is a machine-readable storage including machine-readable instructions, when executed, to implement a method or realize an apparatus as set forth in one of examples 46-58.

What is claimed is:

1. An apparatus to instruct movement based on sensor data, the apparatus comprising:
    a sensor data receiver to receive sensor data from a sensor device;
    a preference receiver to receive a user preference;
    an external system controller to determine a level of power consumption of an external system; and
    a preference analyzer to:
        in response to determining that the sensor data indicates that the user preference is not met at a first location, determine if a second location has a condition that meets the user preference; and
        in response to determining that the second location has the condition that meets the user preference, cause transmission of a notification to instruct movement to the second location.

2. An apparatus as defined in claim 1, wherein the the preference analyzer is to cause the transmission of the notification in response to determining that the second location has the condition that meets the user preference and in response to the level of power consumption of the external system meeting a threshold.

3. An apparatus as defined in claim 2, wherein the preference analyzer is further to, in response to determining that the level of power consumption is below the threshold, cause the external system controller to instruct a condition controller to operate to change the condition at the first location.

4. An apparatus as defined in claim 1, wherein the external system is at least one of a heating system or a cooling system.

5. An apparatus as defined in claim 4, wherein the user preference is a desired ambient temperature.

6. An apparatus as defined in claim 1, further including a client communicator to determine the first location associated with the sensor data and the user preference.

7. An apparatus as defined in claim 1, wherein the sensor device is an Internet of Things device to be carried by a user.

8. An apparatus as defined in claim 1, wherein the notification includes a map of conditions at the second location and other location.

9. An apparatus as defined in claim 8, wherein the preference analyzer is further to generate the map based on sensor data received from a plurality of sensor devices.

10. An apparatus as defined in claim 1, wherein the user preference is received from the sensor device.

11. An apparatus as defined in claim 1, further including a client communicator to transmit the notification to a client device that transmitted the user preference.

12. An apparatus as defined in claim 11, wherein the sensor device is the client device.

13. A method to instruct movement based on sensor data, the method comprising:
    determining a level of power consumption of an external system;
    in response to determining that received sensor data indicates that a user preference is not met at a first location, determining if a second location has a condition that meets the user preference; and
    in response to determining that the second location has the condition that meets the user preference, transmitting a notification to instruct movement to the second location.

14. A method as defined in claim 13, wherein the transmitting of the notification is also in response to determining that the second location has the condition that meets the user preference and in response to the level of power consumption of the external system meeting a threshold.

15. A method as defined in claim 14, further including, in response to determining that the level of power consumption is below the threshold, instructing a condition controller to operate to change the condition at the first location.

16. A method as defined in claim 13, wherein the external system is at least one of a heating system or a cooling system.

17. A method as defined in claim 16, wherein the user preference is a desired ambient temperature.

18. A method as defined in claim 13, further including determining the first location associated with the sensor data and the user preference.

19. A method as defined in claim 13, wherein the sensor data is received from an Internet of Things device carried by a user.

20. A method as defined in claim 13, wherein the notification includes a map of conditions at the second location and other location.

21. A non-transitory machine readable storage medium comprising instructions that, when executed, cause a machine to at least:
   determine a level of power consumption of an external system;
   in response to determining that received sensor data indicates that a user preference is not met at a first location, determine if a second location has a condition that meets the user preference; and
   in response to determining that the second location has the condition that meets the user preference, transmit a notification to instruct movement to the second location.

22. A non-transitory machine readable storage medium as defined in claim 21, wherein the transmitting of the notification is also in response to the level of power consumption of the external system meeting a threshold.

\* \* \* \* \*